US010590979B2

(12) United States Patent
Freis et al.

(10) Patent No.: US 10,590,979 B2
(45) Date of Patent: Mar. 17, 2020

(54) CORROSION PROTECTION FOR MECHANICAL JOINTS

(71) Applicant: Ford Global Technologies, LLC, Dearborn, MI (US)

(72) Inventors: Amanda Kay Freis, Ann Arbor, MI (US); Thomas Norton, Ann Arbor, MI (US); Peter A. Friedman, Ann Arbor, MI (US); Garret Sankey Huff, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 423 days.

(21) Appl. No.: 15/414,153

(22) Filed: Jan. 24, 2017

(65) Prior Publication Data

US 2018/0209468 A1      Jul. 26, 2018

(51) Int. Cl.
*F16B 33/00* (2006.01)
*F16B 19/08* (2006.01)
*F16B 37/14* (2006.01)

(52) U.S. Cl.
CPC .......... *F16B 33/008* (2013.01); *F16B 19/086* (2013.01); *F16B 33/004* (2013.01); *F16B 37/14* (2013.01)

(58) Field of Classification Search
CPC ........ F16B 33/008; F16B 19/086; F16B 5/04; F16B 33/004
See application file for complete search history.

(56) References Cited

U.S. PATENT DOCUMENTS

| 5,322,381 A * | 6/1994 | Argo, II ................. B65D 47/06 |
| | | 222/566 |
| 5,375,754 A | 12/1994 | Botha et al. |
| 6,962,469 B2 | 11/2005 | Wang et al. |
| (Continued) | | |

FOREIGN PATENT DOCUMENTS

| CN | 205244070 U | 5/2016 |
| EP | 0512649 A1 | 11/1992 |

OTHER PUBLICATIONS

Simufact, http://www.simufact.com/joining-body-in-white.html, "Simulating joining processes in car body production with Simufact", 2016, 13 pgs.

(Continued)

*Primary Examiner* — Jeffrey H Aftergut
*Assistant Examiner* — Jaeyun Lee
(74) *Attorney, Agent, or Firm* — Vincent Mastrogiacomo; Brooks Kushman P.C.

(57) ABSTRACT

Systems and methods for reducing or eliminating corrosion in joined materials are disclosed, for example, multi-material joints. The system may include a sealing device including a body and a tip. The tip may be configured to form a seal around a local region of a material having a fastener disposed therein. The sealing device may be configured to apply a sealant material from the tip to the local region and form a cap thereover. The tip of the sealing device may form a cavity between the material and the inner surface of the tip, which may be filled with the sealant material to form the cap. In one embodiment, the sealing device may be configured to couple to the joining device that inserted the fastener. This may allow for accurate and robust placement of the sealant material directly after the fastener is inserted.

20 Claims, 8 Drawing Sheets

(56) References Cited

U.S. PATENT DOCUMENTS

| | | |
|---|---|---|
| 8,808,478 B2 | 8/2014 | Nitsche et al. |
| 9,260,133 B2 | 2/2016 | Hata et al. |
| 2009/0007410 A1* | 1/2009 | Baigorri Hermoso ... B21J 15/10 29/524.1 |
| 2011/0024943 A1* | 2/2011 | Kelley ................ B05C 11/1002 264/263 |
| 2015/0183022 A1 | 7/2015 | Trinick |
| 2016/0245323 A1 | 8/2016 | Freis et al. |

OTHER PUBLICATIONS

South Wales Regional Group, "Modem steel and joining techniques: bonding and riveting in modern cars", http://www.soe.org.uk/events/general-events/general-events-reports/item/modern-steel-and-joining-techniques-bonding-and-riveting-in-modem-cars/, Sep. 16, 2014, 3 pgs.

Dezhi, L. et al., "Self-Piercing Riveting-A Review", http://wrap.warwick.ac.uk/79605/1/WRAP_Li_Self%20Piercing%20Riveting-A%20review.pdf, 2016, 83 pgs.

* cited by examiner

CORROSION PROTECTION FOR MECHANICAL JOINTS

TECHNICAL FIELD

The present disclosure relates to corrosion protection systems and methods for mechanical joints.

BACKGROUND

The automotive industry continues to focus on reducing the weight of vehicles ("light weighting") to meet customer expectations on fuel economy and CAFE requirements. To achieve weight reductions, interest in alternative materials, including aluminum-intensive vehicle applications, has increased. Joining methods for vehicle bodies have traditionally relied on resistance-spot welding (e.g., in steel structures). In the case of aluminum-intensive vehicles and other mixed-metal joining applications, mechanical joining technology may replace spot welding. Examples of mechanical joining technologies may include self-piercing rivets (SPR), friction element welding (FEW), and flow drill screws (FDS). Mechanical joining technologies may allow for high production assembly processes. In addition, they may be compatible with adhesive, where both methods can be used in conjunction. As mixed material joining continues to grow, one concern for mechanical joining is corrosion. Without a way to manage corrosion in mixed material joints, their use may be limited.

SUMMARY

In at least one embodiment, a fastener sealing system is provided. The system may include a sealing device including a body and a tip. The tip may be configured to form a seal around a fastened region of a material having a fastener disposed therein. The sealing device may be configured to apply a sealant material from the tip to the fastened region and form a cap thereover.

The system may include a joining device configured to insert the fastener into the material, and the sealing device may be mounted to the joining device. In one embodiment, the joining device is configured to retract from the material after inserting the fastener and the sealing device is configured to move on the joining device towards the fastened region to apply the sealant. The tip may include a flexible portion configured to conform to the material and form a seal therewith while applying the sealant material. In one embodiment, the tip is configured to form a cavity between an inner surface of the tip and the material and the sealing device delivers the sealant into the cavity to form the cap.

The sealing device may include a valve configured to control a flow of the sealant material into the cavity. In one embodiment, the sealing device is configured to deliver pressurized air to the cavity. In another embodiment, at least a portion of the tip of the sealing device is transparent or able to transmit ultraviolet (UV) rays to the fastened region. The sealing device may be configured to form a cap over an entire portion of the fastener protruding from the material. In one embodiment, the fastener has a fastener head having a first width and the sealing device is configured to form a cap having a second width that is 5-400% larger than the first width over the fastener head to completely cover the fastener head. The sealing device may be configured to form a seal around a fastened region of the material that is deformed by the fastener but not penetrated by the fastener (e.g., an SPR button).

In at least one embodiment, a method is provided. The method may include inserting a fastener into a local region of a material using a joining device; retracting the joining device from the local region; and positioning a tip of a sealing device that is coupled to the joining device adjacent to the local region and locally applying a sealant material to the local region.

The fastener may include a fastener head and a fastener tail and applying the sealant to the local region may include completely covering and encapsulating the fastener head and/or the fastener tail with the sealant. In one embodiment, the sealing device is movably coupled to the joining device and positioning the tip of the sealing device includes moving the sealing device relative to the joining device. Positioning the tip of the sealing device adjacent to the local region may include forming a seal between the tip and the local region. Forming the seal between the tip and the local region may include forming a cavity within the tip and applying the sealant material to the local region includes filling the cavity with the sealant. In one embodiment, the positioning step may be performed directly after the retracting step and before another fastener is inserted into the material by the joining device. The method may include positioning a second tip of a second sealing device that is coupled to the joining device adjacent to the local region and applying a sealant material to the local region. The sealant material from the tip and the second tip may then form a single contiguous sealant cap over the local region.

In at least one embodiment, a fastener sealing system is provided. The system may include a sealing device configured to couple to a fastener-inserting device; and the sealing device including a tip configured to apply a sealant material to a fastened region of a material having a fastener disposed therein to form a cap completely covering the fastened region.

In one embodiment, the tip is configured to seal around the fastened region of the material and form a cavity therebetween and the sealing device is configured to deliver the sealant material into the cavity to form the cap. In another embodiment, the fastener has a fastener head having a first width and the sealing device is configured to form a cap having a second width that is 5-400% larger than the first width over the fastener head to completely cover and encapsulate the fastener head.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
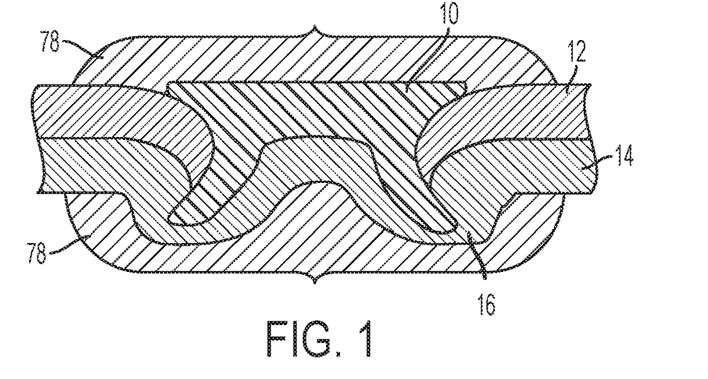
FIG. 1 is an example of a cross-section of a self-piercing rivet (SPR) joint.
Figure 2:
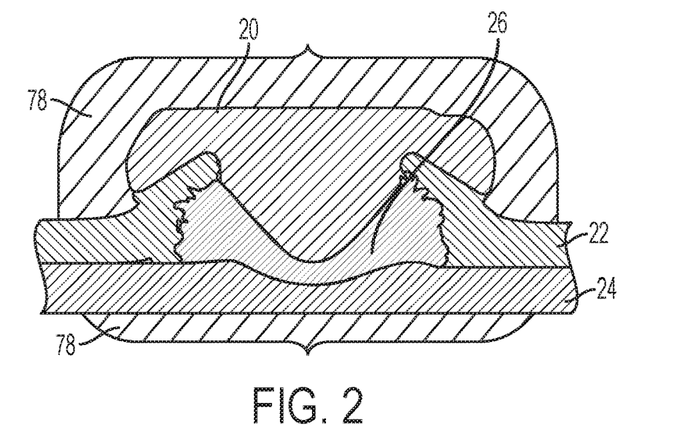
FIG. 2 is an example of a cross-section of a friction element welding (FEW) joint.
Figure 3:
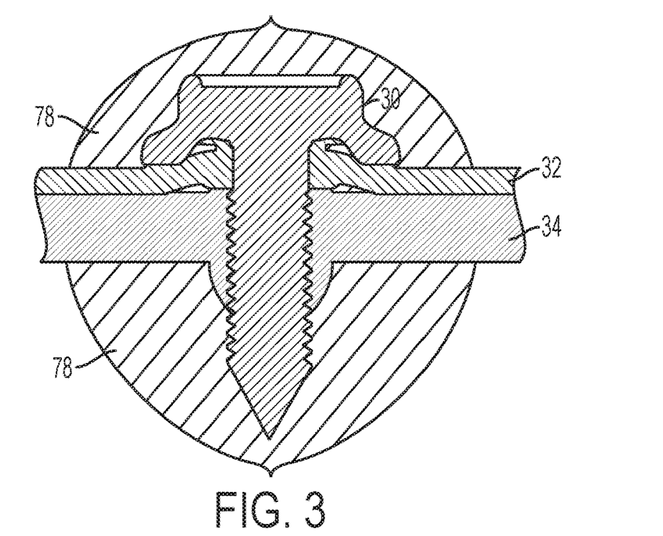
FIG. 3 is an example of a cross-section of a flow drill screw (FDS) joint.

With reference to FIGS. 1-3, several examples of mechanical fasteners or fixings are shown. As used herein, a mechanical fastener or fixing may refer to any mechanical element used to join two materials. Conventional examples of fasteners may include screws, bolts, nails, or rivets. However, additional fasteners have been developed more recently, for example, to address the challenges of mixed-metal joining or multi-material joining. Accordingly, as used herein, the term mechanical fastener or fixing may apply to any of the conventional fasteners, more advanced fasteners currently developed, or fasteners developed in the future. In each of the fasteners in FIGS. 1-3, a cap 78 of sealant material 70 is shown covering the head of the fastener and the tail of the fastener (or a region of the bottom sheet where the tail of the fastener is disposed). However, the cap 78 may be formed on only one of the head and the tail (or tail region). The cap 78 of sealant material 70 and methods of applying it are disclosed in additional detail later in the description.

FIG. 1 shows an example of a self-piercing rivet (SPR) 10 used to join two metal sheets 12, 14. SPRs are known in the art and will not be described in detail. In general, the SPR process includes clamping two or more sheets between a die and a blankholder and driving a semi-tubular rivet into the materials between a punch and die in a press tool. The SPR pierces the top sheet 12 (and any middle sheet(s)) and flares within the lower/bottom sheet 14 to mechanically interlock the sheets. The inherent forming in the bottom sheet may create a so-called button 16 on the underside of the bottom sheet.

FIG. 2 shows an example of a joint formed by friction element welding (FEW). FEW is known in the art and will not be described in detail. In general, the FEW process includes rotating a joining element 20, named a friction element, at a high rotation speed (e.g., 5,000 rpm or higher) and pressing it against the surface of a top sheet 22. The frictional heat generated by the element 20 plasticizes the top sheet 22 and allows it to penetrate the material without a pre-drilled hole or melting of the sheet. When the element 20 contacts the bottom sheet 24, the friction and temperature increase and a so-called upset 26 is formed. The upset 26 may form a rigid diffusion-based bond between the two sheets 22, 24. The material displaced from the top sheet 22 may fill a groove of the friction element 20, which may provide an additional mechanical lock.

FIG. 3 shows an example of a joint formed by a flow drill screw (FDS). Flow drill screws are known in the art and will not be described in detail. In general, the FDS process includes rotating the FDS 30 and applying a force against the top sheet 32. Friction between the FDS 30 and the top sheet 32 heats and softens the top sheet. The FDS 30 then penetrates the top sheet and subsequent sheets below and creates a hole. The material in the sheets forms a boss in the stack. The FDS 30 penetrates each sheet in the stack until the tip extends through the bottom sheet 34 of the stack. Female threads are then created in the extrusion by a thread-forming zone of the fastener. Once the threads are generated, the FDS 30 is rotated into the threads until its head seats against the top sheet 32.

In general, the joining methods described above, as well as others, may include inserting a fastener such that it contacts or extends through two or more materials (e.g., sheets of material). However, some fasteners may only extend into/through a single material (e.g., sheet) or only through one material at a time. For example, self-piercing welding studs. The fastener may have a top/head portion that rests on top of or flush with the first/proximal/top material or sheet (e.g., the first material contacted by the fastener). The fastener may also have a second/distal/bottom portion that extends into or through a bottom material or sheet (e.g., the final material contacted by the fastener). The fastener may contact or extend through additional intermediate materials or sheets between the first and second materials.

Accordingly, there may be an exposed interface between the head of the fastener and the top material and/or an exposed interface between the bottom of the fastener and the bottom material. For example, the head of the fastener (e.g., SPR, FEW, or FDS) may be generally circular in the plane parallel to the top sheet, which may result in a circular exposed interface between the head of the fastener and the top sheet. For a FDS, the bottom of the fastener may extend through the bottom sheet and create an exposed interface between the fastener and the bottom sheet. For a SPR, while the bottom of the fastener may not penetrate through the bottom surface of the bottom sheet, there may be small cracks generated in the protruding button that is formed.

Any of these interfaces or cracks may provide areas where corrosion can occur. Cracks and/or small gaps at the interface between the fastener and the material(s) being joined may allow for the incursion of corrosive environmental substances, such as water (which may have additional corrosive substances therein, such as salt). These substances may penetrate between the fastener and the joined materials and may directly corrode some or all of the components in the joint (e.g., fastener or one or more sheets). In addition, for mixed-metal or mixed-material joints, the presence of different materials and an electrolyte may allow for galvanic corrosion to occur. To prevent or mitigate corrosion at the joint, a sealer or sealant may be applied to prevent water or other substances from penetrating the joint (e.g., interfaces, cracks, etc.). However, in many situations, many fasteners are used to join two or more materials and access to the fastener locations may be difficult or impossible once the joined components are assembled or combined with other parts (e.g., on an assembly line, such as a vehicle assembly line). In addition, applying a sealant to the fasteners after they are inserted may require a locating feature, such as a camera/optical system, which may add equipment and costs to the process. Large quantities of sealant may be applied to cover large areas of an assembly in order to attempt to cover the fastener locations, however, this may be very costly, may add significant weight, and/or is not guaranteed to adequately seal each fastener.

With reference to FIGS. 4-8, a joining and sealing system 50 is disclosed. The system includes a joining or fixing device 52 and a sealing device 54. The sealing device 54 may be mounted on or coupled to the fixing device 52 and may be movable relative thereto. The joining device 52 may have an applicator 56 mounted to an arm 58. The arm 58 may be a robot arm or a manually positioned arm. The applicator 56 may be movable relative to the arm 58. In the embodiment shown, the applicator 56 may move axially (e.g., up and down, vertically) relative to the arm 58. However, the relative motion of the applicator 56 need not be axial.

Figure 4:
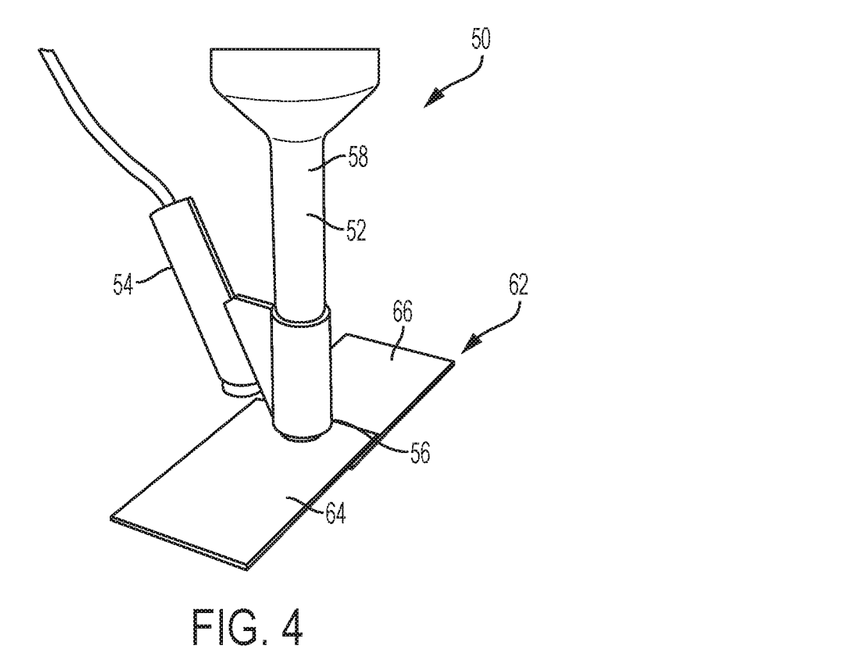
FIG. 4 is a perspective view of a joining and sealing system during a joining phase, according to an embodiment.

With reference to FIG. 4, the system 50 is shown in a joining or fastening phase in which the applicator 56 of the joining device 52 is inserting/applying a fastener 60 to a stack 62 of materials. The joining device 52 may insert/apply the fastener 60 into a local region of the stack 62 to join the materials in the stack. After the fastener 60 in inserted, the local region may be referred to as the joined region. The joined region may refer to a region in each material/sheet in the stack 62 that has the fastener 60 extending therethough or that the fastener 60 or fastening process caused to deform (e.g., an SPR button or the bottom sheet of a FEW). In the embodiment shown, the stack 62 includes a first/top sheet 64 and a second/bottom sheet 66. While two sheets are shown, there may be additional, intermediate sheets in the stack 62 or there may be only a single sheet. In addition, the stack 62 may include non-sheet materials (e.g., castings, moldings, extrusions, plates, etc.). The materials/sheets may be metals, such as steel, aluminum, magnesium, alloys thereof, or other metals/alloys. One or more of the sheets may also be non-metals, such as polymers or composites (e.g., carbon, glass, or other fiber-reinforcements). Accordingly, the stack 62 may be a mixed-metal or mixed-material stack or it may be a homogenous stack (e.g., each sheet is same/similar material).

Figure 5:
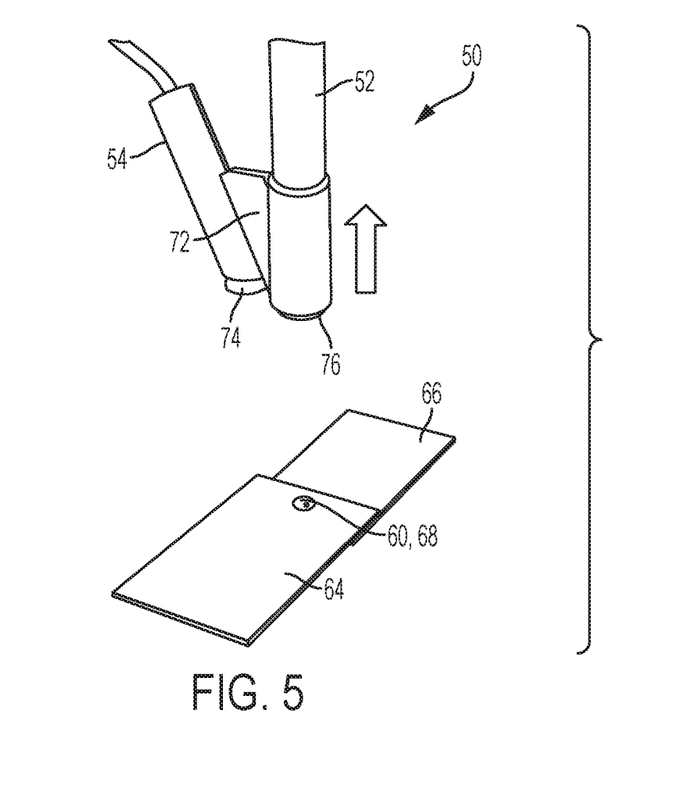
FIG. 5 is a perspective view of a joining and sealing system during a retracting phase, according to an embodiment.

With reference to FIG. 5, the system 50 is shown in a retracting phase in which the applicator 56 retracts after inserting/applying the fastener 60 to join the stack 62. The retraction may be in an upward direction away from the stack 62. In embodiments where the applicator 56 is movable axially relative to the arm 58, the applicator 56 may move axially upward in a proximal direction relative to the arm 58. The retraction may move the applicator 56 back to an initial position prior to the fastening phase in FIG. 4 or the retracted position may be different than the initial position. The retraction of the applicator 56 may expose the fastener 60, for example a head 68 of the fastener 60.

Figure 6:
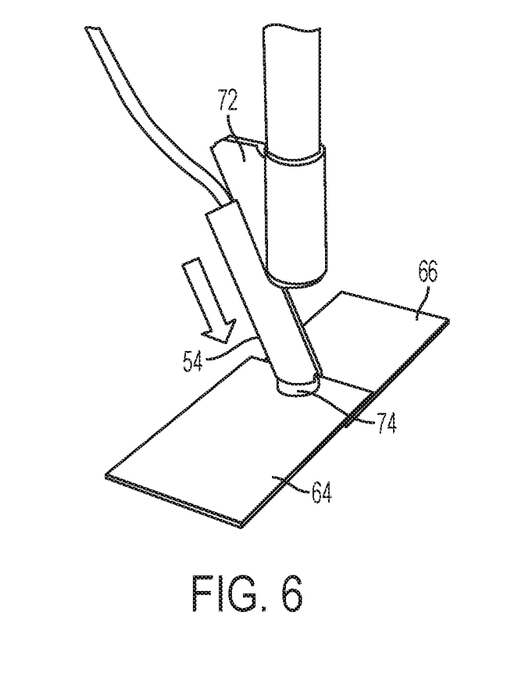
FIG. 6 is a perspective view of a joining and sealing system during a sealing phase, according to an embodiment.

With reference to FIG. 6, the system 50 is shown in a sealing phase in which the sealing device 54 extends towards the stack 62 and applies or deposits a sealant material 70 on, over, and/or around the head 68 of the fastener 60. In embodiments where the sealing device 54 is mounted to the joining device 52, the sealing device 54 may move along a guide 72 on the joining device 52. In one embodiment, the sealing device 54 may be slidably mounted on the guide 72. The sealing device may move in a diagonal direction relative to the longitudinal axis of the joining device 52 and/or arm 58. The movement of the sealing device 54 may be controlled in any suitable manner, for example, using pneumatics, hydraulics, a spring, an electric motor, a servo, any combination thereof, or other mechanisms known in the art. The movement may be controlled using a microcontroller or processor.

The sealing device 54 may have a tip or head 74 at its distal end that is configured to contact the top sheet 64 of the stack 62 and to fully or at least partially surround the head 68 of the fastener 60. The tip 74 may be formed of a flexible or semi-flexible material such that it conforms to the surface of the sheet 64 and forms a seal therewith. The sealing device 54 may be configured such that when it is in the extend sealing position, such as shown in FIG. 6, the tip 74 is positioned in the same or the substantially same position as the tip 76 of the joining device 52 when it inserts the fastener 60, such as shown in FIG. 4. Accordingly, the sealing device 54 may be configured to reliably and repeatedly position the tip 74 over/around the head 68 of the fastener 60 immediately after the fastener 60 has been inserted. In embodiments where the sealing device 54 is slidably mounted to the joining device 52, the positioning of the tip 74 over the fastener 60 may be accomplished by setting the geometry and dimensions of the joining device 52, sealing device 54, and guide 72 such that the tip 74 is at the same position during the sealing phase as the tip 76 of the joining device 52 was during the joining phase. While the sealing device 54 is shown as slidably mounted to the joining device 52, other configurations are contemplated by the present disclosure. One of ordinary skill in the art, based on the present disclosure, will understand that modifications may be made to the system 50 in order to allow the tip 74 of the sealing device 54 to be positioned over the fastener 60 during the sealing phase.

Figure 7:
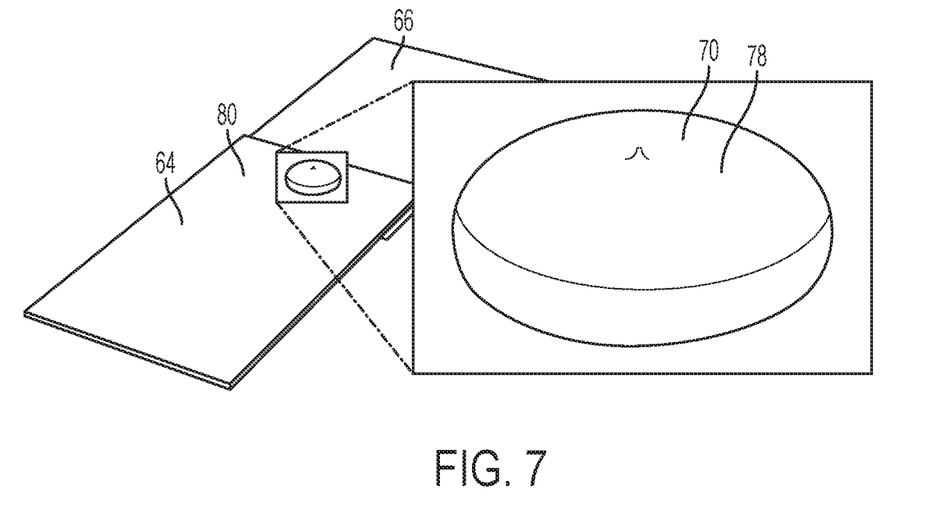
FIG. 7 is a perspective view and an enlarged view of a sealed mechanical joint, according to an embodiment.

With reference to FIG. 7, the sealing device 54 may be retracted after depositing the sealant material 70 on/around the fastener 60 (e.g., the head). The sealant material 70 may form a cap or cover 78 over/around the fastener 60. After the sealing device 54 is retracted, the system 50 may be moved to another location on the stack 62 (or another stack) to insert another fastener 60 and apply a cap 78 thereon. Alternatively, the system 50 may be stationary, and the stack 62 may be moved relative thereto to insert the next fastener (or both the system 50 and the stack 62 may be moved). In one embodiment, the head 68 of the fastener may be completely covered, enclosed, or encapsulated by the cap 78. In another embodiment, any and all exposed portions of the fastener 60 extending/protruding from the top surface 80 of the top sheet 64 may be completely covered, enclosed, or encapsulated by the cap 78. While complete coverage of the fastener 60 may provide improved corrosion protection, in some embodiments the head 68 or exposed portions of the fastener 60 may be only partially completely covered, enclosed, or encapsulated by the cap 78.

The sealant material 70 may be applied while in a liquid or semi-liquid state, such as a paste. The sealant material may be any suitable material that is able to flow through the sealing device and adhere to the top sheet 64 and/or the fastener 60. The sealant material 70 may be curable to form a solid material. Curing may be performed by heating the sealant material 70 or it may take place at ambient temperature after a certain length of time. Alternatively, the sealant material 70 may be cured by exposure to light, such as ultraviolet (UV) light, or by a chemical additive. In embodiments where the sealant material 70 is cured by UV light, the tip 74 may be transparent or otherwise allow the transmission of UV light therethrough and into its inner cavity. The sealant material, once cured, may form a bond with the top surface of the sheet 64 and/or the exposed portion of the fastener 60 (e.g., the head 68). The bond may be a chemical bond and/or a mechanical bond. The cured cap 78 may be paintable and may be able to withstand relatively high temperatures, such as those experienced during a paint bake cycle.

Figure 8:
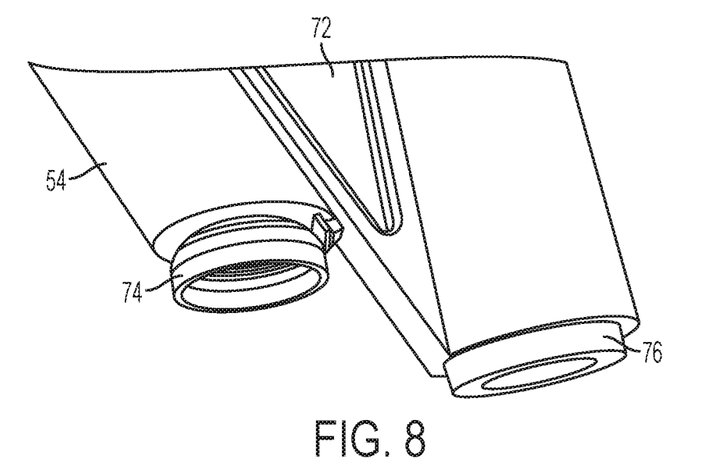
FIG. 8 is an enlarged perspective view of the tips of a joining device and a sealing device of a joining and sealing system, according to an embodiment.

With reference to FIG. 8, an enlarged view of the tip 74 of the sealing device 54 and the tip 76 of the joining device 52 are shown. The tip 74, and the resulting cap 78, are shown as dome-shaped in FIGS. 4-8, however, the tip 74 may have any suitable shape for covering/surrounding the exposed fastener 60. The sealant material 70 may generally conform to the shape of the tip 74 and may be viscous enough to generally retain the shape of the tip 74 when the sealing device 54 is retracted. The tip 76 of the joining device 52 may vary depending on the type of fastener being inserted by the joining device 52, as will be understood by one of ordinary skill in the art based on the present disclosure.

With reference to FIGS. 9-12, a joining and sealing system 100 is disclosed. The general operation of system 100 may be similar to that of system 50 and, absent any differences discussed below, the disclosure of components above may also apply to those in system 100. The system includes a joining or fixing device 102 and a sealing device 104. The sealing device 104 may be mounted on or coupled to the fixing device 102 and may be movable relative thereto, similar to the configuration described for system 50. The joining device 102 may have an applicator 106 mounted to an arm (not shown). The arm may be a robot arm or a manually positioned arm. The applicator 106 may be movable relative to the arm. In the embodiment shown, the applicator 106 may move axially (e.g., up and down, vertically) relative to the workpiece. However, the relative motion of the applicator 106 need not be axial. The sealing device 104 may move along a guide 108 on the joining device 102, similar to system 50. In one embodiment, the sealing device 104 may be slidably mounted on the guide 108. The sealing device 104 may move in a diagonal direction relative to the longitudinal axis of the joining device 104 and/or the arm.

Figure 9:
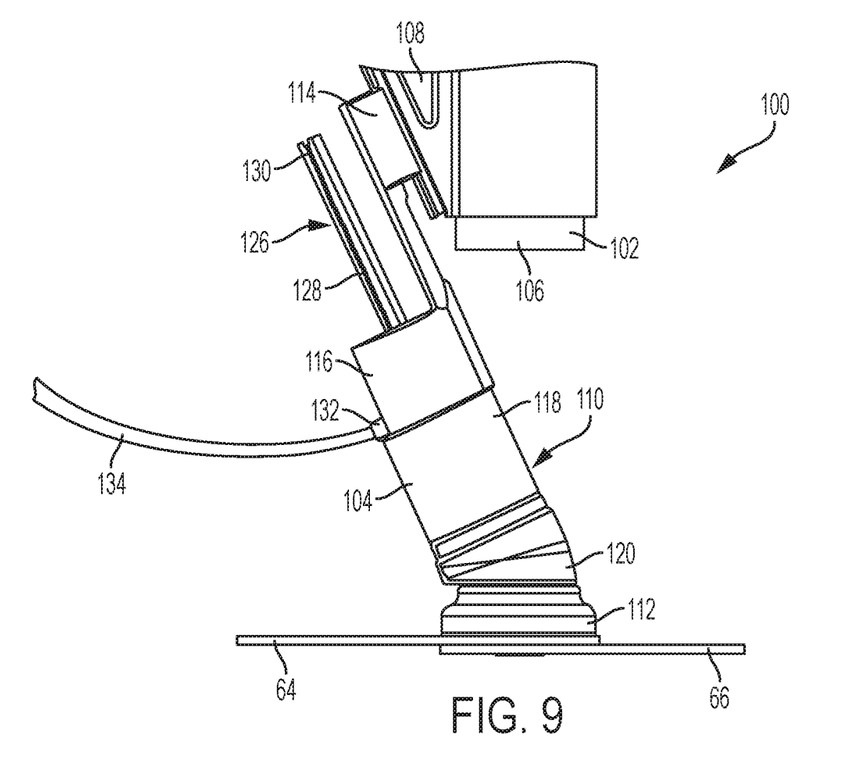
FIG. 9 is a side view of a sealing device of a joining and sealing system forming a seal over a mechanical fixing, according to an embodiment.

With reference to FIG. 9, the sealing device 104 is shown in partial cut-away to show some component parts of the sealing device 104. The sealing device 104 may include a body 110, a tip 112, and a guiding portion 114. The body 110 may be a single component or may be an assembly of multiple components. In the embodiment shown, the body 110 includes a first or proximal end 116, a middle portion 118, and a second or distal end 120. The proximal end 116 may be connected to the guiding portion 114, or the two components may be a single, integral part. The distal end 120 may be coupled to the tip 112, and the middle portion 118 may be disposed between and connect the proximal end 116 and the distal end 120. While the body 110 is shown and described as having three components, one of ordinary skill in the art will understand, based on the present disclosure, that some components may be combined or separated such that there are fewer or a greater number of components.

The guiding portion 114 may cooperate with the guide 108 of the joining device 102 to facilitate movement of the sealing device 104 relative to the joining device 102. For example, the guiding portion may include a channel or recess 122 formed therein that may receive a protrusion 124 of the guide 108. The channel 122 and the protrusion 124 may cooperate to guide the movement of the sealing device 104 relative to the joining device 102.

The sealing device 104 may include a valve 126 having a valve stem 128. The valve stem 128 may extend through an opening in the body 110. The valve stem 128 may have a lumen or passage 130 therein extending along a longitudinal axis of the stem. The passage 130 may be coupled to a source of pressurized fluid, such as air. The valve 126 may control the application of the sealant material 70 to the fastener 60. While a valve 126 having a valve stem 128 is shown and described, any suitable valve may be used to control the flow of sealant material. The sealant material 70 may be introduced to the sealing device 104 via a port 132. The port 132 may be disposed on the body 110 of the sealing device 104. A tube or conduit 134 may connect or couple to the port 132 and may supply the sealant material 70 to the port 132 and the sealant device 104 from a sealant material source, such as a tank, hopper, or other container.

Figure 10:
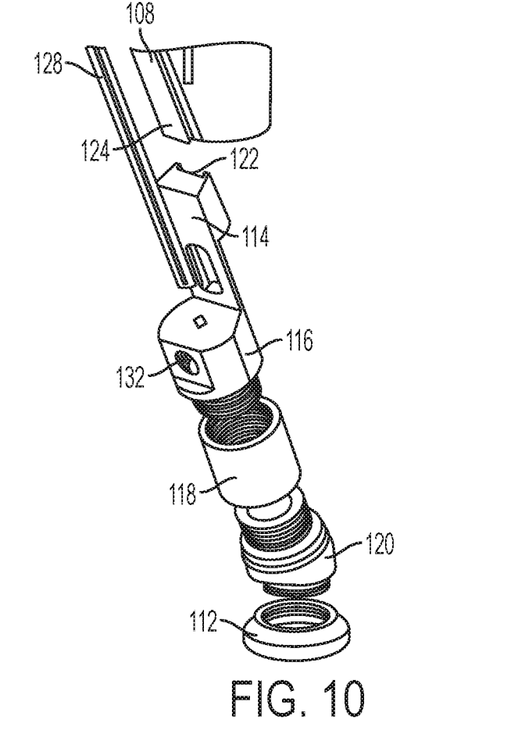
FIG. 10 is an exploded view of a sealing device of a joining and sealing system forming a seal over a mechanical fixing, according to an embodiment.

With reference to FIG. 10, an exploded view of the system 100 is shown. As described above, the body 110 may include a proximal end 116, a middle portion 118, and a distal end 120. As shown in FIG. 10, the portions may be connected by threaded engagements. For example, the middle portion 118 may include female threads and the proximal and distal ends 116, 120 may include male threads that are configured to engage the female threads of the middle portion 118. However, any combination of threading may be used to connect the portions of the body 110. In addition, other coupling mechanisms may also be used, such as adhesives, snap-fit, mechanical fasteners, etc.

The tip 112 may also attach to the distal end 120 by a threaded engagement. For example, the tip 112 may have female threads and the distal end 120 may have male threads (or vice versa). However, similar to above, any type of connection between the tip 112 and the distal end 120 may be used. In at least one embodiment, the tip 112 may be removably attached to the distal end 120 (e.g., designed/configured to be removed and re-attached without damaging the components). As described in greater detail, below, there may be multiple tips 112, which may be interchangeable.

Figure 11:
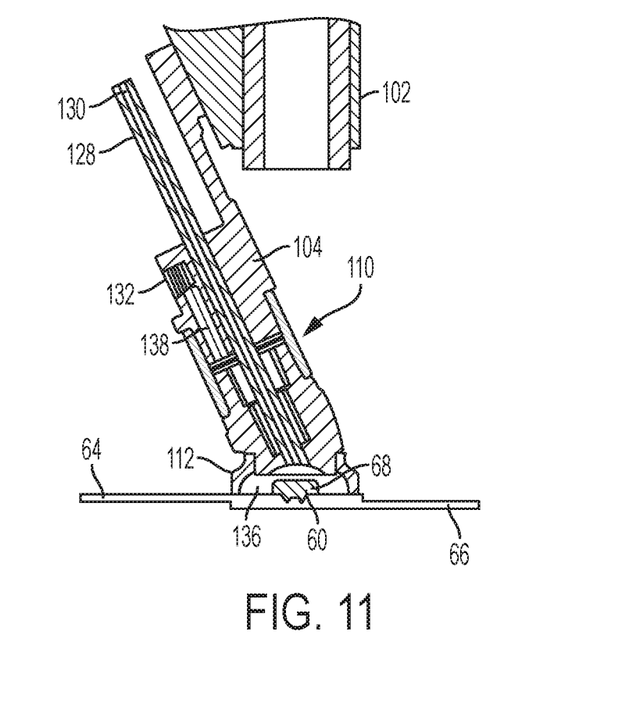
FIG. 11 is a cross-sectional view of the sealing device of FIG. 9.

With reference to FIG. 11, a cross-sectional view of FIG. 9 is shown. The sealing device 104 is in the extended position and the tip 112 is in contact with the top sheet 64 of a material stack 62. In at least one embodiment, the tip 112 forms a seal with the top sheet 64 over/around the inserted fastener 60, for example, around the head 68 or other exposed portion of the fastener 60. When the tip 112 is sealed over/around the fastener 60, a cavity 136 may be formed within the tip 112 that is bound by the inner surface of the tip 112 and the top sheet 64.

The sealing device 104 may be configured to introduce the sealant material 70 into the cavity 136 in order to form the cap 78, described above. In one embodiment, the sealant material 70 may be introduced into the body 110 from the tube 134 via the port 132. An internal passage 138 within the body 110 may transport the sealant material 70 to the cavity 136. The valve 126 may control the flow of sealant material from the passage 138 to the cavity 136. In the embodiment shown, the flow may be allowed or prevented by moving the valve stem 128 along its longitudinal axis. When the stem 128 is retracted, the passage 138 may be in fluid communication with the cavity 136 and the sealant material 70 may be allowed to flow into the cavity 136 from the passage 138. When the stem 128 is in an extended position, which may be the resting or default position, it may block fluid communication between the passage 138 and the cavity 136, preventing the sealant material 70 from flowing into the cavity 136. The stem valve 128 may be controlled in any suitable manner, for example, using pneumatics, hydraulics, a spring, an electric motor, a servo, any combination thereof, or other mechanisms known in the art. The movement may be controlled using a microcontroller or processor.

Accordingly, when the sealing device 104 is in position such that the tip 112 is sealed over the fastener 60, the sealant material 70 may be introduced to the cavity 136 by retracting the valve stem 128 and allowing the material to flow into the cavity 136 via the passage 138. When the cavity 136 has been filled or substantially filled, the valve stem 128 may be extended to cut off the flow of sealant material 70. Once the flow of sealant has stopped, the sealing device 104 may be retracted and the system 100 may move on to another joining location to start the process over (e.g., insert fastener, retract joining device, extend sealing device, apply sealant, retract sealing device).

In at least one embodiment, the stem 128 may have a passage 130 along its longitudinal axis. As described above, this passage 130 may be connected to a source of pressurized fluid, such as air. This pressurized air may be used to form a cap 78 of sealant material that has a smooth and unblemished appearance, as well as to facilitate the clean removal of the sealing device 104 and tip 112 from the applied sealant material 70 in the cavity 136. In one embodiment, a positive air pressure (e.g., greater than ambient) may be applied to the cavity 136 through the passage 130. The air pressure may be applied throughout the flow of sealant material 70 into the cavity 136 or only near the end of the flow when the cavity 136 is filled or nearly filled. For example, the air pressure may be applied during removal of the sealing device 104 and/or tip 112. The positive air pressure may prevent or mitigate the sealant material 70 from sticking to the inner surface of the tip 112. This may allow for a clean removal of the tip 112 after the sealant is deposited, which may provide a robust cap 78 and keep the inside of the tip 112 clean for the next sealant application.

Figure 12:
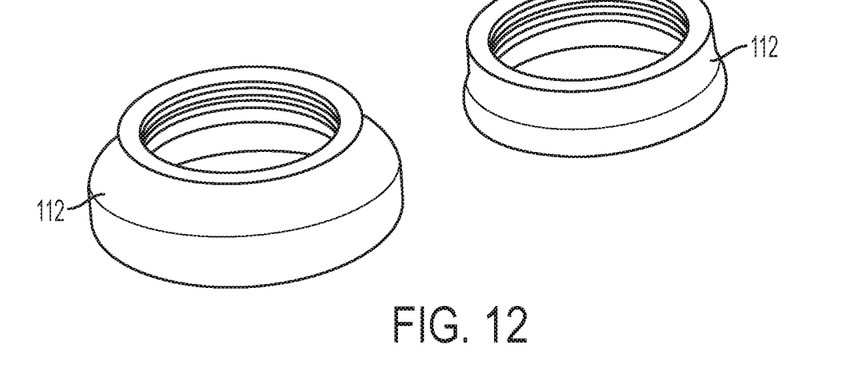
FIG. 12 is a perspective view of two embodiments of sealing tips of a sealing device.

With reference to FIG. 12, two examples of sealing device 104 different tips 112 are shown. These tips may also apply to those for system 50. As described above, the tips 112 may be removably attached from the end of the sealing device and different tips may be interchangeable. The tips may have different sized and/or shaped cavities in order to accommodate different mechanical fixing/fastener types and designs. For example, if the fastener has a head that protrudes from the surface of the joined material, the tip 112 may have a larger or taller cavity. Conversely, if the fastener has a shallow head or is flush with the surface, the cavity may be shorter/shallower because less sealant material may be necessary to cover or encapsulate it. The tips 112 may be formed of a flexible or semi-flexible material that conforms to the surface being joined in order to form a seal therewith. The entire tip need not be flexible/semi-flexible, for example, only a bottom portion may be flexible/semi-flexible and an upper portion may be rigid.

As described above, the tips 112 may be configured to apply a cap 78 that may completely cover/encapsulate the exposed portion of the fastener (e.g., head). The tips 112 may be configured to be a certain amount larger than the fastener portion to be covered. For example, a width/diameter of the tip 112 may be up to 5%, 10%, 25%, 50%, 100%, 200%, or 500% larger than a width/diameter of the fastener head. In one embodiment, the width/diameter of the tip 112 may be 5-500% larger than the width/diameter of the fastener head, or any sub-range therein, such as 5-400%, 5-250%, 5-200%, 5-100%, 5-50%, 25-400%, 25-200%, 25-100%, 5-75%, 25-75%, or others. This extra width/diameter may provide a safety factor to ensure that the fastener is covered even is there are slight errors or variances in the location of the cap 78.

With reference to FIGS. 13-16, another embodiment of a sealing device 204 is disclosed for use in a joining and sealing system, such as systems 50 and 100. The sealing device 204 may be similar to the sealing devices 54 and 104, and similar elements/components may be numbered the same as sealing device 104 but starting with a "2" as the first digit (e.g., body 210 may be similar to body 110). Unless otherwise stated, these similarly numbered elements may share the same description as above. The general operation of sealing device 204 may be similar to that of devices 54 and 104 and, absent any differences discussed below, the disclosure of components above may also apply to those in sealing device 204.

The sealing device 204 may be used in conjunction with a joining device, such as those in systems 50 and 100, however, it may also be used separately or uncoupled from a joining device. In one embodiment, the sealing device 204 may be used to apply a sealant material 70 to a bottom or underneath side of a fastener 60 or bottom sheet 66 of a stack 62. For example, the sealing device 204 may be used to apply a sealant material to the protruding bottom portion of a FDS or to the button formed in the bottom sheet 66 by a SPR. Accordingly, instead of being at an oblique angle to the sheet/fastener, as shown for sealing devices 54/104, the body 210 of the sealing device may be oriented perpendicular or substantially perpendicular to the sheet surface. However, these orientations are not required (for sealing devices 54, 104, or 204), and any suitable orientation may be used. The sealing device 204 may movable independent from a joining device. It may be mounted to an arm (not shown), such as a robot arm or a manually positioned arm.

Figure 13:
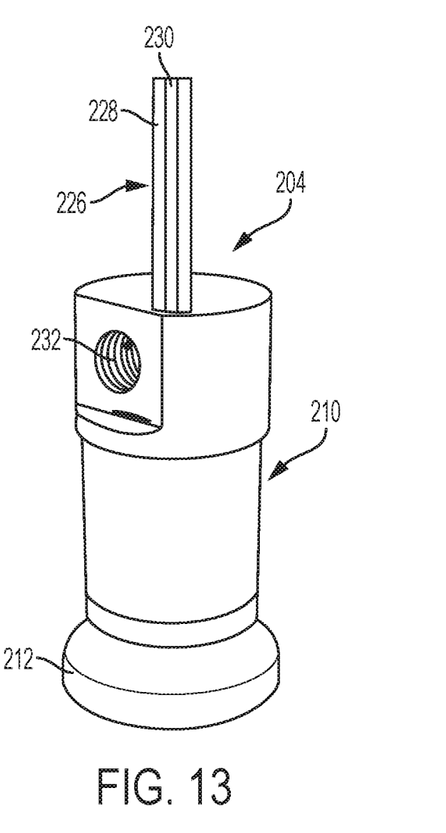
FIG. 13 is a perspective view of an axial sealing device of a joining and sealing system, according to an embodiment.

With reference to FIG. 13, the sealing device 204 is shown in a front perspective view. The sealing device 204 may include a body 210 and a tip 212. The body 210 may be a single component or may be an assembly of multiple components. In the embodiment shown, the body 210 includes a first or proximal end 216, a middle portion 218, and a second or distal end 220. The distal end 220 may be coupled to the tip 212, and the middle portion 218 may be disposed between and connect the proximal end 216 and the distal end 220. While the body 210 is shown and described as having three components, one of ordinary skill in the art will understand, based on the present disclosure, that some components may be combined or separated such that there are fewer or a greater number of components.

The sealing device 204 may include a valve 226 having a valve stem 228. The valve stem 228 may extend through an opening in the body 210. The valve stem 228 may have a lumen or passage 230 therein extending along a longitudinal axis of the stem. The passage 230 may be coupled to a source of pressurized fluid, such as air. The valve 226 may control the application of the sealant material 70 to the fastener 60. The sealant material 70 may be introduced to the sealing device 204 via a port 232. The port 232 may be disposed on the body 210 of the sealing device 204. A tube or conduit (not shown) may connect or couple to the port 232 and may supply the sealant material 70 to the port 232 and the sealant device 204 from a sealant material source, such as a tank, hopper, or other container.

Figure 14:
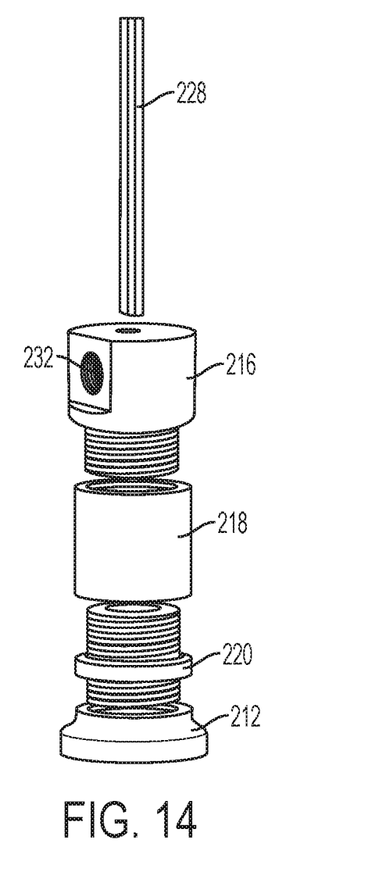
FIG. 14 is a cross-sectional view of the axial sealing device of FIG. 13.

With reference to FIG. 14, an exploded view of the sealing device 204 is shown. As described above, the body 210 may include a proximal end 216, a middle portion 218, and a distal end 220. As shown in FIG. 14, the portions may be connected by threaded engagements. For example, the middle portion 218 may include female threads and the proximal and distal ends 216, 220 may include male threads that are configured to engage the female threads of the middle portion 218. However, any combination of threading may be used to connect the portions of the body 210. In addition, other coupling mechanisms may also be used, such as adhesives, snap-fit, mechanical fasteners, etc.

The tip 212 may also attach to the distal end 220 by a threaded engagement. For example, the tip 212 may have female threads and the distal end 220 may have male threads (or vice versa). However, similar to above, any type of connection between the tip 212 and the distal end 220 may be used. In at least one embodiment, the tip 212 may be removably attached to the distal end 220 (e.g., designed/ configured to be removed and re-attached without damaging the components). As described above, there may be multiple tips 212, which may be interchangeable.

Figure 15:
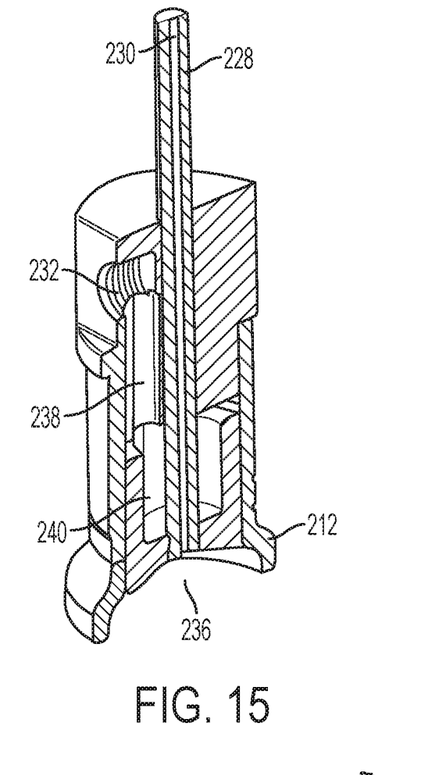
FIG. 15 is another cross-sectional view of the axial sealing device of FIG. 13.
Figure 16:
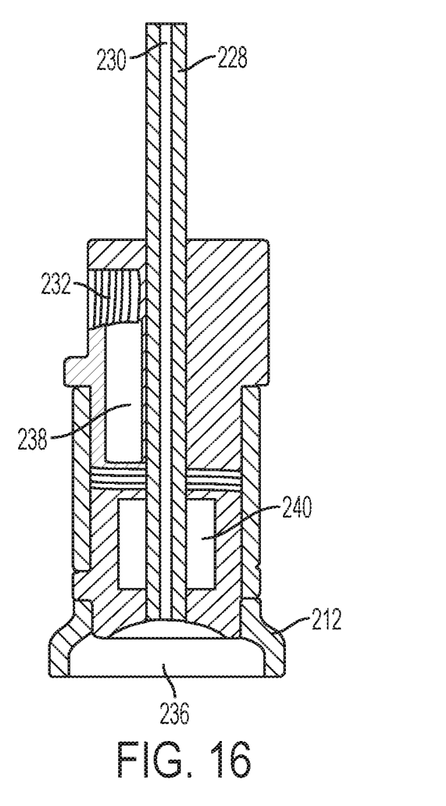
FIG. 16 is an exploded view of the axial sealing device of FIG. 13.

With reference to FIGS. 15-16, cross-sectional views of FIG. 13 are shown. The tip 212 is configured to form a seal with a top sheet 64 over/around an inserted fastener 60, for example, around the head 68 or other exposed portion of a fastener 60. When the tip 212 is sealed over/around the fastener 60, a cavity 236 may be formed within the tip 212 that is bound by the inner surface of the tip 212 and the top sheet 64. The sealing device 204 may be configured to introduce the sealant material 70 into the cavity 236 in order to form the cap 78, described above. In one embodiment, the sealant material 70 may be introduced into the body 210 from the tube via the port 232. An internal passage 238 within the body 210 may transport the sealant material 70 to the cavity 236. The valve 226 may control the flow of sealant material from the passage 238 to the cavity 236. In one embodiment, the body 220 may have defined therein a chamber or reservoir 240 that is configured to receive the sealant material from the passage 238. The sealant material 70 may flow from the chamber 240 to the cavity 238 when the valve 226 is opened. A similar chamber may be present in the sealing devices 54 and 104.

In the embodiment shown, the flow may be allowed or prevented by moving the valve stem 228 along its longitudinal axis. When the stem 228 is retracted, the passage 238 and/or chamber 240 may be in fluid communication with the cavity 236 and the sealant material 70 may be allowed to flow into the cavity 236 from the passage 238 and/or chamber 240. When the stem 228 is in an extended position, which may be the resting or default position, it may block fluid communication between the passage 238/chamber 240 and the cavity 236, preventing the sealant material 70 from flowing into the cavity 236. The stem valve 228 may be controlled in any suitable manner, for example, using pneumatics, hydraulics, a spring, an electric motor, a servo, any combination thereof, or other mechanisms known in the art. The movement may be controlled using a microcontroller or processor.

Accordingly, when the sealing device 204 is in position such that the tip 212 is sealed over a fastener 60, the sealant material 70 may be introduced to the cavity 236 by retracting the valve stem 228 and allowing the material to flow into the cavity 236 via the passage 138/chamber 240. When the cavity 236 has been filled or substantially filled, the valve stem 228 may be extended to cut off the flow of sealant material 70. Once the flow of sealant has stopped, the sealing device 204 may be retracted and may move on to another joining location to apply a sealant cap to another fastener area.

In at least one embodiment, the stem 228 may have a passage 230 along its longitudinal axis. As described above, this passage 230 may be connected to a source of pressurized fluid, such as air. This pressurized air may be used to form a cap 78 of sealant material that has a smooth and unblemished appearance, as well as to facilitate the clean removal of the sealing device 204 and tip 212 from the applied sealant material 70 in the cavity 236. In one embodiment, a positive air pressure (e.g., greater than ambient) may be applied to the cavity 236 through the passage 230. The air pressure may be applied throughout the flow of sealant material 70 into the cavity 236 or only near the end of the flow when the cavity 236 is filled or nearly filled. For example, the air pressure may be applied during removal of the sealing device 204 and/or the tip 212. The positive air pressure may prevent or mitigate the sealant material 70 from sticking to the inner surface of the tip 212. This may allow for a clean removal of the tip 212 after the sealant is deposited, which may provide a robust cap 78 and keep the inside of the tip 212 clean for the next sealant application.

With reference to FIGS. 17-21, a joining and sealing system 250 is disclosed. The system 250 may be similar to the systems 50 and 10, and similar elements/components may be numbered the same as system 50 but starting with a "2" as the first digit (e.g., sealing device 254 may be similar to sealing device 54). Unless otherwise stated, these similarly numbered elements may share the same description as above. The general operation of system 250 may be similar to that of system 50 and, absent any differences discussed below, the disclosure of components above may also apply to those in system 250. The system 250 includes a joining or fixing device 252 and one or more sealing devices 254. In the embodiment shown, there are two sealing devices 254, however, there may be a single sealing device 254 or three or more sealing devices 254. If there are multiple sealing devices 254, they may be substantially identical except for changes based on symmetry (e.g., they may be mirror images).

The sealing devices 254 may be mounted on or coupled to the fixing device 252 and may be movable relative thereto. The joining device 252 may have an applicator 256 mounted to an arm 258. The arm 258 may be a robot arm or a manually positioned arm. The applicator 256 may be movable relative to the arm 258. In the embodiment shown, the applicator 256 may move axially (e.g., up and down, vertically) relative to the arm 258. However, the relative motion of the applicator 256 need not be axial.

Figure 17:
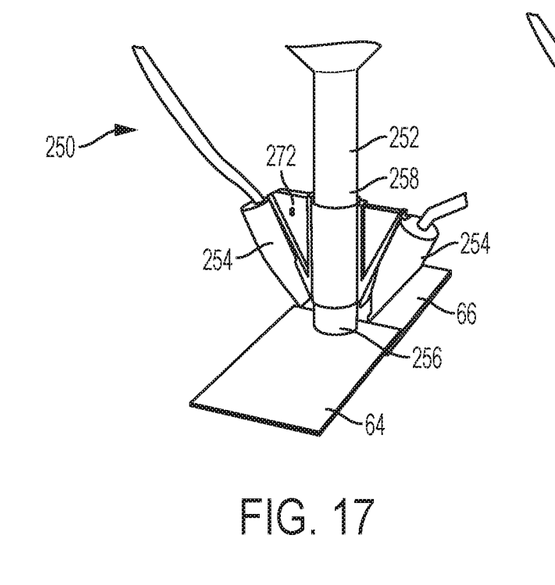
FIG. 17 is a perspective view of a joining and sealing system during a joining phase, according to an embodiment.

With reference to FIG. 17, the system 250 is shown in a joining or fastening phase in which the applicator 256 of the joining device 252 is inserting/applying a fastener 60 to a stack 62 of materials. In the embodiment shown, the stack 62 includes a first/top sheet 64 and a second/bottom sheet 66. While two sheets are shown, there may be additional, intermediate sheets in the stack 62. In addition, the stack 62 may include non-sheet materials. The materials/sheets may be metals, such as steel, aluminum, magnesium, alloys thereof, or other metals/alloys. One or more of the sheets may also be non-metals, such as polymers or composites (e.g., carbon fiber, fiberglass, or others). Accordingly, the stack 62 may be a mixed-metal or mixed-material stack or it may be a homogenous stack (e.g., each sheet is same/similar material).

Figure 18:
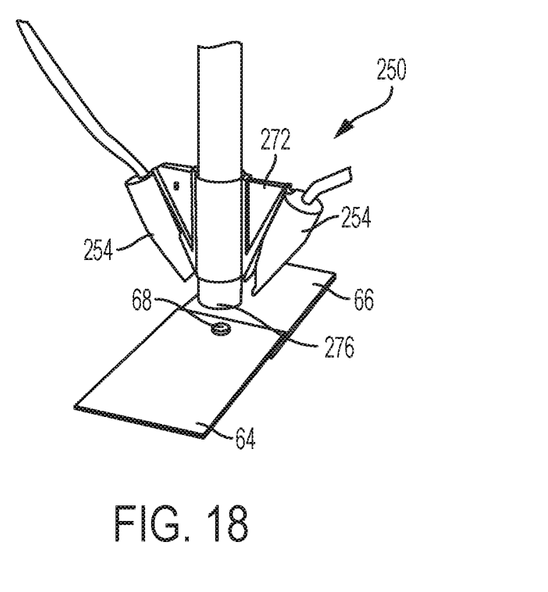
FIG. 18 is a perspective view of a joining and sealing system during a retracting phase, according to an embodiment.

With reference to FIG. 18, the system 250 is shown in a retracting phase in which the applicator 256 retracts after inserting/applying the fastener 60 to join the stack 62. The retraction may be in an upward direction away from the stack 62. In embodiments where the applicator 256 is movable axially relative to the arm 258, the applicator 256 may move axially upward in a proximal direction relative to the arm 258. The retraction may move the applicator 256 back to an initial position prior to the fastening phase in FIG. 17 or the retracted position may be different than the initial position. The retraction of the applicator 256 may expose the fastener 60, for example a head 68 of the fastener 60.

Figure 19:
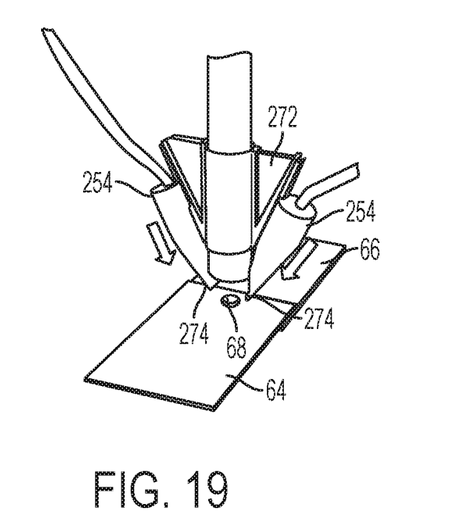
FIG. 19 is a perspective view of a joining and sealing system during an extending phase, according to an embodiment.
Figure 20:
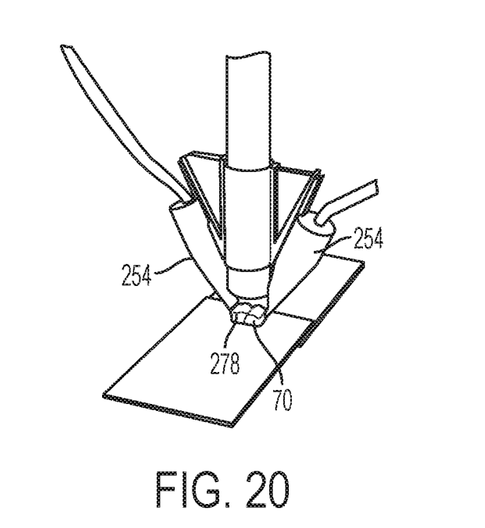
FIG. 20 is a perspective view of a joining and sealing system during a sealing phase, according to an embodiment.

With reference to FIGS. 19-20, the system 250 is shown in a sealing phase in which the sealing devices 254 extends towards the stack 62 and apply or deposit a sealant material 70 on, over, and/or around the head 68 of the fastener 60. In embodiments where the sealing devices 254 are mounted to the joining device 252, the sealing devices 254 may move along a guide 272 on the joining device 252. A single guide 272 may cooperate with multiple sealing devices 254 (e.g., all of them) or each sealing device 254 may have its own guide 272. In one embodiment, the sealing devices 254 may be slidably mounted on the guide 272. The sealing devices may move in a diagonal direction relative to the longitudinal axis of the joining device 252 and/or arm 258. The movement of the sealing devices 54 may be controlled in any suitable manner, for example, using pneumatics, hydraulics, a spring, an electric motor, a servo, any combination thereof, or other mechanisms known in the art. The movement may be controlled using a microcontroller or processor.

Each sealing device 254 may have a tip or head 274 at its distal end that is configured to contact the top sheet 64 of the stack 62 and to fully or at least partially surround the head 68 of the fastener 60. The tip 274 may be formed of a flexible or semi-flexible material such that it conforms to the surface of the sheet 64 and forms a seal therewith. The sealing devices 254 may be configured such that when they are in the extended sealing position, such as shown in FIG. 20, the tips 274 are positioned near the position of the tip 276 of the joining device 252 when it inserts the fastener 60, such as shown in FIG. 17. If there are two sealing devices 254, their tips may be located on opposite sides of the fastener head or exposed area. If there are three or more sealing devices 254, their tips may surround the fastener head or exposed area. The tips may be evenly spaced around the fastener head. For example, if there are two tips, they may be 180 degrees apart and if there are three tips they may be 120 degrees apart (assuming a circular fastener head).

Accordingly, the sealing devices 254 may be configured to reliably and repeatedly position the tips 274 near/around the head 68 of the fastener 60 immediately after the fastener 60 has been inserted. In embodiments where the sealing devices 254 are slidably mounted to the joining device 252, the positioning of the tips 274 over the fastener 60 may be accomplished by setting the geometry and dimensions of the joining device 252, sealing devices 254, and guide(s) 272 such that the tips 274 are at/near/around the same position during the sealing phase as the tip 276 of the joining device 252 was during the joining phase. While the sealing devices 254 are shown as slidably mounted to the joining device 252, other configurations are contemplated by the present disclosure. One of ordinary skill in the art, based on the present disclosure, will understand that modifications may be made to the system 250 in order to allow the tips 274 of the sealing devices 254 to be positioned over/around the fastener 60 during the sealing phase.

Figure 21:
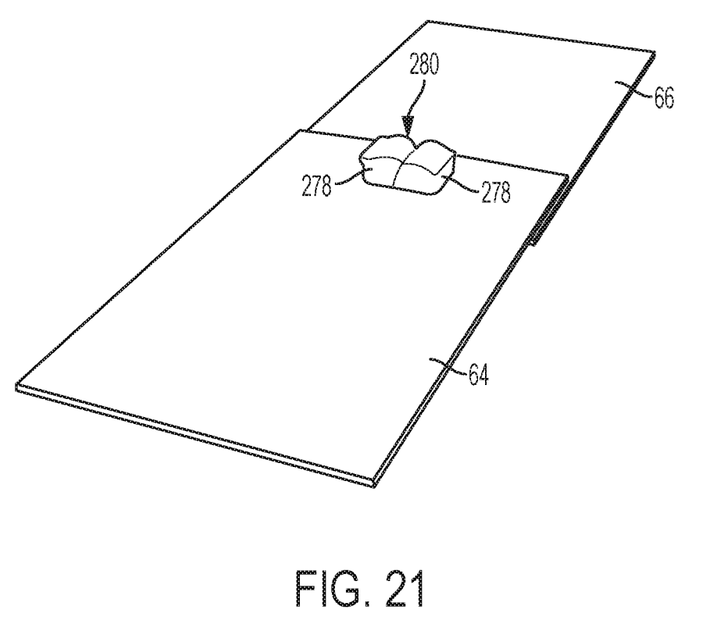
FIG. 21 is a perspective view of a sealed joint formed by the joining and sealing system of FIGS. 17-20, according to an embodiment.

With reference to FIGS. 20-21, the sealing devices 254 may deposit the sealant material 70 on/around the fastener 60 (e.g., the head). The sealant material 70 from each sealing device 254 may form drop or globule 278 over/around at least a portion of the fastener 60 (e.g., the head 68). Accordingly, there may be a drop 278 formed for each sealing device 254. The sealing devices may be positioned and configured such that the drops 278 may meet and converge to form a single cap 280. In one embodiment, the head 68 of the fastener may be completely covered, enclosed, or encapsulated by the cap 280. In another embodiment, any and all exposed portions of the fastener 60 extending/protruding from the top surface 80 of the top sheet 64 may be completely covered, enclosed, or encapsulated by the cap 280. While complete coverage of the fastener 60 may provide improved corrosion protection, in some embodiments the head 68 or exposed portions of the fastener 60 may be only partially completely covered, enclosed, or encapsulated by the cap 280. Unlike the sealing device 54, the tips 274 of the sealing devices 254 may not have a dome-like shape that covers/seals around the fastener 60. However, by using multiple sealing devices 254, complete coverage of the exposed fastener area may be accomplished by merging two or more drops 278 to form a contiguous cap 280.

Accordingly, systems and methods for protecting fasteners and joints including fasteners are provided. A sealant material may be applied onto an exposed portion of a fastener, such as the head, or onto an area of the joint impacted by the joining/fixing process (e.g., a button from an SPR). The sealant may prevent or reduce corrosion in the joint by preventing water or other corrosive substances from infiltrating cracks or gaps in the fastener, the joined materials, or the interface therebetween. The system may apply a sealant cap on each fastener or fastener area directly after the fastener is inserted (e.g., before moving on to the next joining location). The device that applies the sealer may be coupled to the joining device such that the sealant is applied in the same location where the fastener was inserted. The joining device may retract and the sealing device may extend to the same location at the fastener to apply the sealant. The disclosed systems and methods may allow for light-weight, reliable, efficient, and cost effective corrosion protection of each fastener inserted. This is in contrast to other approaches, such as applying large quantities of sealant over large areas in the hope that every fastener is covered. Such an approach is wasteful in both materials and costs and provides uncertain corrosion protection, while also adding significantly more weight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fastener sealing system, comprising:
a joining device configured to insert a fastener into a material to form a fastened region of the material having the fastener disposed therein;
a sealing device including:
a body; and a tip configured to form a seal around the fastened region of the material having the fastener disposed therein; and
a guide mounted to the joining device and slidably mounting the sealing device,
the sealing device is configured to move in a diagonal direction relative to a longitudinal axis of the joining device on the guide towards the fastened region to apply a sealant material, and
the sealing device configured to apply the sealant material from the tip of the sealing device to the fastened region and to form a cap thereover.

2. The system of claim 1, wherein the joining device is configured to retract from the material after inserting the fastener.

3. The system of claim 1, wherein the tip includes a flexible portion configured to conform to the material and form the seal therewith while applying the sealant material.

4. The system of claim 3, wherein the tip is configured to form a cavity between an inner surface of the tip and the material and the sealing device delivers the sealant into the cavity to form the cap.

5. The system of claim 4, wherein the sealing device is configured to deliver pressurized air to the cavity.

6. The system of claim 1, wherein at least a portion of the tip of the sealing device is transparent or able to transmit ultraviolet (UV) rays to the fastened region.

7. The system of claim 1, wherein the sealing device is configured to form a cap over an entire portion of the fastener protruding from the material.

8. The system of claim 1, wherein the fastener has a fastener head having a first width and the sealing device is configured to form a cap having a second width that is 5-400% larger than the first width over the fastener head to completely cover the fastener head.

9. The system of claim 1 wherein the sealing device is configured to form a seal around a fastened region of the material that is deformed by the fastener but not penetrated by the fastener.

10. A fastener sealing system, comprising:
a joining device configured to insert a fastener into a material to form a fastened region of the material having the fastener disposed therein;
a guide mounted to the joining device; and
a sealing device configured to slidably couple to the guide such that the sealing device is disposed at an oblique angle relative to the joining device, the sealing device configured to move on the guide between a retracting phase and a sealing phase, and the tip configured to apply a sealant material during while the sealing device is in the sealing phase to the fastened region of the material having the fastener disposed therein to form a cap covering the fastened region.

11. The system of claim 10, wherein the tip is configured to seal around the fastened region of the material and form a cavity therebetween and the sealing device is configured to deliver the sealant material into the cavity to form the cap.

12. The system of claim 10, wherein the fastener has a fastener head having a first width and the sealing device is configured to form a cap having a second width that is 5-400% larger than the first width over the fastener head to completely cover and encapsulate the fastener head.

13. The system of claim 10, wherein the tip of the sealing device includes an outlet surface and the joining device includes an outlet surface, and the outlet surface of the tip and the outlet surface of the joining device are parallel to each other when the sealing device is in the retracting phase.

14. The system of claim 10, wherein the tip of the sealing device includes an outlet surface and the joining device includes an outlet surface, and the outlet surface of the tip and the outlet surface of the joining device are parallel to each other when the sealing device is in the sealing phase.

15. The system of claim 10, wherein the joining device is configured to retract from the material after inserting the fastener.

16. The system of claim 10, wherein the tip includes a flexible portion configured to conform to the material and form the seal therewith while applying the sealant material.

17. The system of claim 16, wherein the tip is configured to form a cavity between an inner surface of the tip and the material and the sealing device delivers the sealant into the cavity to form the cap.

18. The system of claim 17, wherein the sealing device is configured to deliver pressurized air to the cavity.

19. The system of claim 10, wherein at least a portion of the tip of the sealing device is transparent or able to transmit ultraviolet (UV) rays to the fastened region.

20. The system of claim 10, wherein the sealing device is configured to form a cap over an entire portion of the fastener protruding from the material.

* * * * *